United States Patent [19]

Neitz et al.

[11] Patent Number: 4,588,132
[45] Date of Patent: May 13, 1986

[54] FUEL-INJECTION NOZZLE

[75] Inventors: Alfred Neitz, Wendelstein, Fed. Rep. of Germany; Michael L. Monaghan, Downsway, Great Britain

[73] Assignee: Maschinenfabrik Augsburg-Nurnberg, Oberhausen, Fed. Rep. of Germany

[21] Appl. No.: 601,633

[22] Filed: Apr. 18, 1984

[30] Foreign Application Priority Data

Apr. 26, 1983 [GB] United Kingdom ............... 8311336

[51] Int. Cl.⁴ .................................................. B05B 1/32
[52] U.S. Cl. ...................................... 239/453; 239/459; 239/533.5; 239/533.9
[58] Field of Search ................... 123/276, 294, 445; 239/584, 453, 456, 459, 533.3, 533.4, 533.5, 533.6, 533.7, 533.8, 533.9, 533.11, 533.12

[56] References Cited

U.S. PATENT DOCUMENTS

| 1,671,504 | 5/1928 | Barrett ........................... 123/276 |
| 2,901,181 | 8/1959 | Bek ................................ 239/533.7 |
| 4,442,978 | 4/1984 | Seifert ........................... 239/533.9 |
| 4,487,178 | 12/1984 | Neitz et al. ................... 123/276 |

FOREIGN PATENT DOCUMENTS

| 483935 | 10/1929 | Fed. Rep. of Germany ... 239/533.7 |
| 2093118 | 8/1982 | United Kingdom ............. 239/533.9 |
| 2051236 | 6/1983 | United Kingdom . |

Primary Examiner—Andrew M. Dolinar
Attorney, Agent, or Firm—Felfe & Lynch

[57] ABSTRACT

A direct-injection internal combustion engine has a combustion chamber in the form of a body of rotation in the piston head. Means are provided for creating air swirl about the longitudinal axis of the combustion chamber. A fuel-injection nozzle is arranzed to spray fuel on the combustion chamber wall substantially as a film at upper engine speeds and loads, and to mix the fuel directly with the air at idling and lower engine speeds and loads. The nozzle has a nozzle needle longitudinally movable in a nozzle body to open the nozzle for fuel injection. In order to reduce the size of the nozzle, the nozzle needle is arranged to move in a direction outwardly of the nozzle body to open the nozzle and inwardly of the nozzle body to close the nozzle. The nozzle is adapted to open at a slower rate at lower engine speeds and loads and at a faster rate at upper engine speeds and loads.

3 Claims, 2 Drawing Figures

FUEL-INJECTION NOZZLE

BACKGROUND OF THE INVENTION

This invention relates to a fuel-injection nozzle for use in a direct injection internal-combustion engine.

A direct-injection internal combustion engine is known comprising a combustion chamber in the form of a body of rotation. Means are provided for creating air swirl about the longitudinal axis of the combustion chamber. A fuel injection nozzle is provided for spraying fuel on the combustion chamber wall substantially as a film at upper engine loads and speeds and for mixing the fuel directly with the air at idling and lower engine speeds and loads.

A fuel-injection nozzle for such an engine is disclosed in British Patent Specification No. 80 19 257, now U.K. Pat. No. 2,051,236B in which a throttle pintle-nozzle opens by movement of the pintle into the valve.

With a pintle nozzle of this type the closing force of the springs provided must be such that the nozzle always closes securely against the maximum gas pressures occurring in the engine cylinder. Injection nozzles of this type have to be very large.

OBJECTS AND SUMMARY OF THE PREFERRED FORMS OF THE INVENTION

An object of the invention is to provide a fuel-injection nozzle for such an engine which may be made smaller than known nozzles.

The invention provides in a direct-injection internal combustion engine comprising a piston head, a combustion chamber in the form of a body of rotation arranged in said piston head, and means for creating air swirl about the longitudinal axis of said combustion chamber; a fuel-injection nozzle for spraying fuel on the combustion chamber wall substantially as a film at upper engine speeds and loads and for mixing fuel directly with air in the combustion chamber at idling and lower engine speeds and loads, said nozzle comprising a nozzle body, a nozzle needle longitudinally movable in a nozzle body in a direction outwardly of said nozzle body to open the nozzle and in a direction inwardly of said nozzle body to close the nozzle, and means for opening said nozzle at a slower rate at lower engine speeds and loads and at a faster rate at upper engine speeds and loads.

In use gas pressure produced in the combustion chamber acts positively to close the nozzle. Thus, the fuel-injection nozzle may be made smaller, resulting in a simplified design of cylinder head and all necessary injection ducts, and therefore a reduction in the total cost for the injection equipment.

In a preferred embodiment the nozzle further comprises a primary spring controlling a first stroke of the nozzle needle and a secondary spring controlling a second stroke of the nozzle needle, the primary spring being arranged between a preliminary-stroke piston and one side of a main piston slidably movable in the nozzle body and the secondary spring being arranged between a surface in the nozzle body and the other side of the main piston.

Preferably, one or more control openings are provided in the preliminary-stroke between the preliminary-stroke piston and the main piston during the said first stroke of the nozzle needle.

Alternatively, the one or more control openings may be provided in a collar provided between the preliminary-stroke piston and the nozzle needle, so that the primary spring acts on the nozzle needle via the collar to urge the nozzle needle to move into the nozzle body and close the nozzle.

Thus, it is possible to control the needle stroke of the injection nozzle in such a way that only predetermined preliminary stroke values are produced with a low rotational speed and load and only an additional stroke is possible during full-load operation. During the preliminary stroke period the rapid response of the nozzle needle valve is restricted by the control openings, while on the other hand after reaching the preliminary stroke the nozzle needle may move relatively quickly to the full stroke.

THE DRAWINGS

Two embodiments of the invention will now be described with reference to the accompanying drawing, wherein.

DETAILED DESCRIPTION

Figure 1:
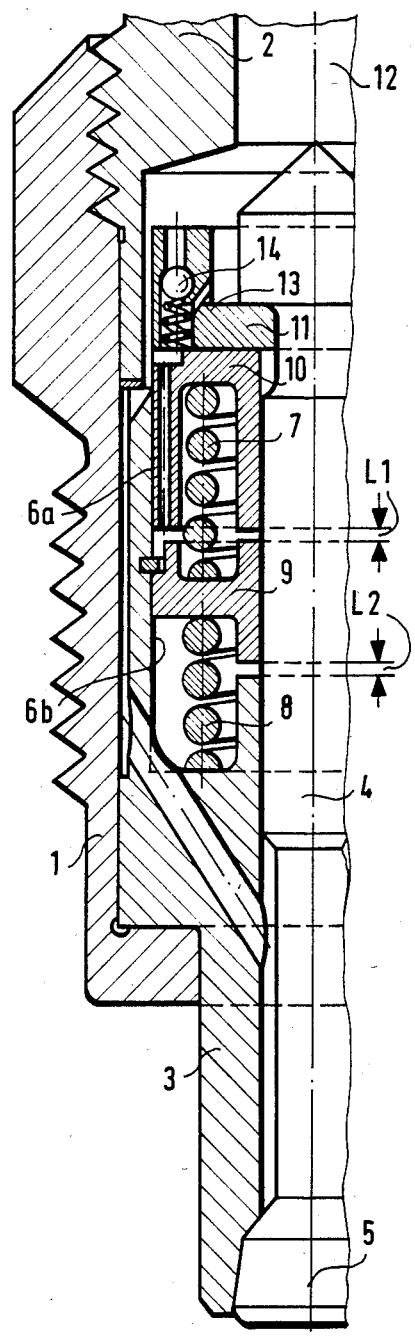
FIG. 1 is a longitudinal section through half of a fuel-injection nozzle.

In FIG. 1 a conventional nozzle holder 1 and an attachment member 2 are used to secure a projecting nozzle comprising a nozzle body 3 and a nozzle needle 4. The valve needle 4 has a valve cone 5 for engagement with a seating on the nozzle body 3, both the cone 5 and the seating being shaped so as to produce the characteristic curve of the stroke or opening cross-section required.

The valve stroke is controlled in such a way that during operation with a low engine speed and load a valve stroke up to a preliminary stroke value $L_1$ occurs, and during full load operation a further stroke path $L_2$ is possible; the complete stroke is thus $L_1 + L_2$. In this way, during the preliminary stroke period, the normally rapid response of the valve is restricted in order to obtain the cross-sectional surfaces or injection quantities required in these operating modes, i.e. the fuel is sprayed substantially as a film on the combustion chamber wall. The valve movement from the preliminary stroke to the complete stroke, during which fuel is mixed directly with air in the combustion chamber, may take place more rapidly. Consequently, closing will take place relatively quickly.

In FIG. 1 the nozzle body 3 comprises a bore 6a, 6b acting as a spring cavity accommodating a primary spring 7 and a secondary spring 8. A main piston 9 is arranged between the springs 7 and 8. The primary spring 7 acts upon a so-called preliminary-stroke piston 10, which is held in position by means of a nozzle-needle holding collar 11.

The primary spring 7 is such that a nominal opening pressure of approximately 80 bar is produced. The second spring 8 in turn is such that at a nominal pressure of 150 to 200 bar a state of equilibrium occurs. Both the main piston 9 and the preliminary-stroke piston 10 are essentially sealed with respect to the fuel and move on the nozzle needle 4 with a sliding fit in the bore 6a, 6b.

During injection fuel is supplied through a fuel inlet 12 and fuel pressure on the valve cone 5 increases. The valve cone 5 moves outwardly, i.e. towards the combustion chamber (not shown) against the bias of the spring 7 and is controlled by fuel flowing away from the spring cavity of the spring 7 by way of control openings 13 provided in the holding collar 11. The desired control of the preliminary stroke $L_1$ is attained by the number and the size of the control openings 13. The speed at which this stroke takes place, and thus the effective cross-section during this preliminary stroke injection operation, results from the speed at which the fuel is forced through the control openings 13 and from the amount of leakage around the pistons 9 and 10. As soon as the piston 10 has covered the preliminary stroke distance $L_1$, the nozzle needle 4 moves the main piston 9. This occurs without substantial damping up to the complete stroke $L_1+L_2$ against the bias of the secondary spring 8.

As soon as injection is completed, the pressure in the fuel supply line is reduced and the nozzle needle can return again to its seating. The return movement of the piston 10 (and of the nozzle needle) from the preliminary stroke level $L_1$ to nil is reinforced by the inflow of fuel to the spring cavity of the spring 7 through a non-return valve 14.

The preliminary-stroke damping piston 10 and the nozzle-needle holding collar 11 may be made in one piece. In order to determine the required degree of damping during the adjustment tests (for each alteration of the degree of damping the control openings must have a different size) it is advantageous if the preliminary-stroke damping piston 10 is formed in two parts. Such an embodiment is shown in FIG. 2.

Figure 2:
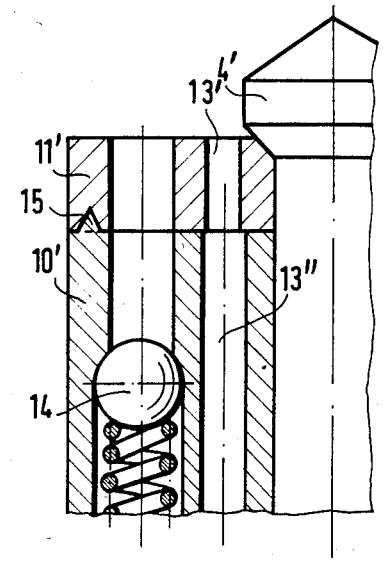
FIG. 2 is a longitudinal section through part of a fuel-injection nozzle.

In FIG. 2 a retaining ring 1' for the nozzle needle 4' is made rotatable and has six equi-distant control openings 13' on the same arc as five damping openings 13'' in the preliminary-stroke damping piston 10'. By stepwise rotation of the rotatable ring 11' a different correspondence between the damping openings 13'' and the control openings 13' may be produced. In other words, the choke effect of the control openings 13', and thus the damping action, is determined by rotating the ring 11'. A specific position of the ring may be set by means of a pin 15 of the preliminary-stroke damping piston 10' engaging a special notch in the ring 11'. Further rotation is then prevented.

Damping of the first movement of a tapered pintle-type nozzle which opens outwardly is attained with the present invention in order to achieve a controlled injection with a specific varying spraying characteristic according to the method described above.

The embodiment described illustrates a simple embodiment for carrying out the invention. Controlled injection may also be achieved with a somewhat modified form of injection nozzle. For example, one or more changeover valves may be used instead of the non-return valve 14. In addition, the control openings 13 may be entirely dispensed with if care is taken to ensure that the necessary delay is produced by fuel leakage around the pistons 9 and 10.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A fuel-injection nozzle for a direct-injection internal combustion engine, comprising a nozzle body, a nozzle needle longitudinally movable in a nozzle body in a direction outwardly of said nozzle body to open the nozzle and in a direction inwardly of said nozzle body to close the nozzle, and means for opening said nozzle at a slower rate at lower engine speeds and loads and at a faster rate at upper engine speeds and loads, and in which nozzle the nozzle needle is movable to open the nozzle by means of fuel pressure against spring bias, the nozzle further comprising a primary spring controlling a first stroke of the nozzle needle at said slower rate of opening and a secondary spring controlling a second stroke of the nozzle needle at said faster rate of opening, a preliminary-stroke piston and a main piston slidably movable in the nozzle body, said primary spring being arranged between said preliminary-stroke piston and one side of said main piston, and said secondary spring being arranged between a surface in the nozzle body and the other side of said main piston, and at least one control opening provided in the preliminary-stroke piston to allow fuel to escape from between the preliminary-stroke piston and the main piston during the said first stroke of the nozzle needle.

2. A fuel injection nozzle for a direct-injection internal combustion engine, comprising a nozzle body, a nozzle needle longitudinally movable in a nozzle body in a direction outwardly of said nozzle body to open the nozzle and in a direction inwardly of said nozzle body to close the nozzle, and means for opening said nozzle at a slower rate at lower engine speeds and loads and at a faster rate at upper engine speeds and loads, and in which nozzle the nozzle needle is movable to open the nozzle by means of fuel pressure against spring bias, the nozzle further comprising a primary spring controlling a first stroke of the nozzle needle at said slower rate of opening and a secondary spring controlling a second stroke of the nozzle needle at said faster rate of opening, a preliminary-stroke piston and a main piston slidably movable in the nozzle body, said primary spring being arranged between said preliminary-stroke piston and one side of said main piston, and said secondary spring being arranged between a surface in the nozzle body and the other side of said main piston, and in which nozzle a collar is provided between the preliminary-stroke piston and the nozzle needle, and said primary spring acts on the nozzle needle via the collar to urge the nozzle needle to move into the nozzle body and close the nozzle, and in which nozzle at least one control is provided in the collar, and in the preliminary-stroke piston, to allow fuel to escape from between the preliminary-stroke piston and the main piston during said first stroke of the nozzle needle.

3. A fuel injection nozzle for a direct-injection internal combustion engine, comprising a nozzle body, a nozzle needle longitudinally movable in a nozzle body in a direction outwardly of said nozzle body to open the nozzle and in a direction inwardly of said nozzle body to close the nozzle, and means for opening said nozzle at a slower rate at lower engine speeds and loads and at a faster rate at upper engine speeds and loads, and in which nozzle the nozzle needle is movable to open the nozzle by means of fuel pressure against spring bias, the nozzle further comprising a primary spring controlling a first stroke of the nozzle needle at said slower rate of opening and a secondary spring controlling a second stroke of the nozzle needle at said faster rate of opening, a preliminary-stroke piston and a main piston slidably movable in the nozzle body, said primary spring being arranged between said preliminary-stroke piston and one side of said main piston, and said secondary spring being arranged between a surface in the nozzle body and the other side of said main piston, and in which nozzle a collar is provided between the preliminary-stroke piston and the nozzle needle, and said primary spring acts on the nozzle needle via the collar to urge the nozzle needle to move into the nozzle body and close the nozzle, and in which nozzle a non-return valve is provided in the collar to allow fuel to flow into between the preliminary-stroke piston and the main piston as the nozzle needle approaches a closed position.

* * * * *